US012798817B2

(12) United States Patent
Ilgenfritz et al.

(10) Patent No.: US 12,798,817 B2
(45) Date of Patent: Nov. 17, 2026

(54) HANDLING SYSTEM FOR A CLEANROOM, A CLEANROOM AND A METHOD FOR LIFTING OFF COVER LAYERS

(71) Applicant: Syntegon Technology GmbH, Waiblingen (DE)

(72) Inventors: Markus Ilgenfritz, Feuchtwangen (DE); Ulrich Krauß, Ilshofen (DE); Stefan Nagler, Unterschneidheim (DE); Samuel Stegmeier, Kreßberg (DE)

(73) Assignee: SYNTEGON TECHNOLOGY GMBH, Stuttgart (DE)

( * ) Notice: Subject to any disclaimer, the term of this patent is extended or adjusted under 35 U.S.C. 154(b) by 458 days.

(21) Appl. No.: 18/419,958

(22) Filed: Jan. 23, 2024

(65) Prior Publication Data

US 2024/0253844 A1 Aug. 1, 2024

(30) Foreign Application Priority Data

Feb. 1, 2023 (DE) ..................... 10 2023 102 479.5

(51) Int. Cl.
*B65B 69/00* (2006.01)
*B25J 15/00* (2006.01)
*B25J 21/00* (2006.01)

(52) U.S. Cl.
CPC ............. *B65B 69/00* (2013.01); *B25J 15/008* (2013.01); *B25J 21/005* (2013.01)

(58) Field of Classification Search
None
See application file for complete search history.

(56) References Cited

U.S. PATENT DOCUMENTS

2003/0103838 A1* 6/2003 Liehs ...................... B65B 69/00 414/403
2003/0120387 A1* 6/2003 Sherwin ............... B25J 15/0052 294/2
2016/0251206 A1 9/2016 Gold et al.
2018/0053144 A1* 2/2018 Wellman .............. B25J 15/0014
2018/0346305 A1* 12/2018 Procyshyn ............... B25J 11/00
2019/0143532 A1* 5/2019 Cutkosky ............... B25J 15/008 294/212
2020/0398438 A1* 12/2020 Jiang ...................... B25J 15/008
2021/0323173 A1* 10/2021 Foland ..................... B25J 15/06
2024/0253844 A1* 8/2024 Ilgenfritz ................ B65B 69/00
2025/0073919 A1* 3/2025 Coulson ............... B25J 15/0009
2025/0073924 A1* 3/2025 Jiang ...................... B25J 15/008

(Continued)

FOREIGN PATENT DOCUMENTS

CN 109789941 A 5/2019
DE 10252572 A1 5/2004

(Continued)

OTHER PUBLICATIONS

German Patent Office Extended Search Report for Application No. 102023102479.5 dated Sep. 25, 2023 (11 pages including English translation).

(Continued)

*Primary Examiner* — Steven M Marsh
(74) *Attorney, Agent, or Firm* — MICHAEL BEST & FRIEDRICH LLP

(57) ABSTRACT

A handling system (10) for a cleanroom (64), a cleanroom (64) having such a handling system (10), and a method for lifting off cover layers (16).

21 Claims, 6 Drawing Sheets

(56) References Cited

U.S. PATENT DOCUMENTS

| | | | | |
|---|---|---|---|---|
| 2025/0282060 | A1* | 9/2025 | Jansen-Troy | B25J 15/0033 |
| 2026/0027714 | A1* | 1/2026 | Takahashi | B25J 9/1656 |

FOREIGN PATENT DOCUMENTS

| | | | |
|---|---|---|---|
| DE | 102020126552 | A1 | 4/2022 |
| DE | 102020128519 | A1 | 5/2022 |
| WO | 2023126771 | A1 | 7/2023 |

OTHER PUBLICATIONS

European Patent Office Extended Search Report for Application No. 24154800.7 dated Jul. 9, 2024 (10 pages including English machine translation).

Chinese Patent Office Action for Application No. 202410126156.8 dated May 29, 2026 (10 pages including English machine translation).

* cited by examiner

HANDLING SYSTEM FOR A CLEANROOM, A CLEANROOM AND A METHOD FOR LIFTING OFF COVER LAYERS

BACKGROUND

The present invention relates to a handling system for a cleanroom. In addition, the present invention relates to a cleanroom in which such a handling system is arranged. Furthermore, the present invention relates to a method for lifting off cover layers.

In pharmaceutical production, drugs or medically active agents are typically filled into pharmaceutical primary packagings. Before the drugs, or active agents, are filled, the primary packagings as such, or primary-packaging parts of the primary packagings, are typically stored in dish-shaped transport containers. Examples of such dish-shaped transport containers are tubs or trays.

Before the primary packagings, or primary-packaging parts, are sterilized, they are often covered with a cover layer. The transport container is then closed with a closure layer. For example, the closure layer is stuck onto an overhang of the transport container. Sterilization is then performed using, for example, gaseous ethylene oxide. Before the sterilized primary packagings, or primary-packaging parts, can be processed, the closure layer and the cover layer must be removed again. When the outer closure layer is being removed, the inner cover layer prevents particles from getting onto or into the primary packagings, or primary-packaging parts. The subsequent lifting-off of the cover layer is a challenging handling operation because the cover layer is arranged in a recessed position in the transport container. It is also necessary to prevent particles from the cover layer getting onto or into the primary packagings, or primary-packaging parts, when the cover layer is being lifted off.

The lifting-off of cover layers by means of vacuum-based gripping units is known in practice. Such a vacuum-based gripping unit attaches itself by suction to the cover layer, and thereby applies the necessary holding force so that the cover layer to which suction has been applied can be lifted off. However, vacuum-based gripping units have several disadvantages that cause problems, in particular, in the processing of toxic/highly potent active agents. After a pharmaceutical production machine has been equipped with a vacuum-based gripping unit, a special decontamination cycle using $H_2O_2$ (hydrogen peroxide) must be used to ensure that there is a sufficient flow of $H_2O_2$ also through the vacuum channels of the gripping unit. However, it is difficult to realize a sufficient flow through the vacuum channels, especially in the case of gripping units of complex design. In the case of toxic and/or highly potent active agents, a filter must also be provided to prevent the active agents, in the form of aerosols, from reaching the outside area in through the vacuum. Furthermore, dismantling the production machine poses a challenge because the vacuum lines up to the filter potentially contain toxic active agents and cannot easily be reached with water during the washdown process. Consequently, the entire assembly must either be packed manually into a sealed bag via glove ports and cleaned separately later, or discharged automatically, for example by a robot, via an RTP port. Vacuum-based gripping units also have the disadvantage that a negative-pressure unit is needed to generate the vacuum. This consumes energy, which increases the operating costs.

SUMMARY

The invention is based on the object of providing a way of lifting off a cover layer from primary packagings, or primary-packaging parts, with the gripping unit used for this purpose being easy to operate. In addition, particles from the cover layer are to be prevented from getting onto or into the primary packagings, or primary-packaging parts, when the cover layer is being lifted off.

This object is achieved according to the invention by a handling system, by a cleanroom and by a method.

Advantageous variants and embodiments are indicated in the description.

The invention thus provides a handling system for a cleanroom. The handling system comprises at least one dish-shaped transport container with pharmaceutical primary packaging elements arranged therein. Preferably, the dish-shaped transport container is a tub. However, the dish-shaped transport container may also be, for example, a tray. The term “pharmaceutical primary packaging elements” means both pharmaceutical primary packagings as such and primary-packaging parts of pharmaceutical primary packagings. Pharmaceutical primary packagings are, for example, injection vials, syringes or carpules. Pharmaceutical primary-packaging parts are, for example, receptacles or closure elements of pharmaceutical primary packagings, in particular injection vials, syringes or carpules.

Preferably, the primary packaging elements are arranged in a nested manner in the transport container. This means that the primary packaging elements are accommodated in a plastic carrier plate referred to as a nest. The nest is arranged in the transport container together with the primary packaging elements. A nested arrangement of the primary packaging elements is preferred. However, the primary packaging elements may also be arranged, for example, loosely next to one another in the transport container. The primary packaging elements may be arranged in a single layer or in multiple layers in the transport container. In the case of a multi-layer arrangement, for example, a plurality of nests of primary packaging elements are arranged stacked on top of one another in the transport container.

According to the invention, the primary packaging elements are covered by a cover layer. The cover layer covers the primary packaging elements and is therefore arranged above the primary packaging elements. In the case of a multi-layer arrangement of primary packaging elements, the cover layer is arranged above the uppermost layer of primary packaging elements. Preferably, the cover layer is arranged in the transport container so that the side wall of the transport container surrounds the cover layer. Preferably, the cover layer is placed directly onto the primary packaging elements. However, the cover layer may also be arranged above and at a distance from the primary packaging elements. The cover layer then rests, for example, on a rabbet of the transport container. Preferably, the cover layer is gas-permeable. This has the advantage that gaseous ethylene oxide can permeate the cover layer to sterilize the primary packaging elements. Preferably, the cover layer is realized as a cover film. A film is a thin, homogeneous fabric. Particularly preferably, the cover layer, or cover film, comprises a polyethylene non-woven fabric.

The handling system according to the invention further comprises a device for lifting off the cover layer from the primary packaging elements, the device comprising a gripping unit for gripping the cover layer.

It is then provided that the gripping unit comprises an adhesive arrangement that is constituted by at least one adhesive element, the adhesive element being realized with an adhesive structure for gripping the cover layer adhesively, that the adhesive arrangement can be brought into physical surface contact with a first side of the cover layer that faces away from the primary packaging elements, and that the diameter of the smallest circle that lies in a holding plane of the adhesive arrangement and surrounds the adhesive arrangement is at least 50 mm.

According to the invention, the adhesive arrangement is constituted by at least one adhesive element, i.e. by a single adhesive element or by a plurality of adhesive elements. When, in the context of the disclosure, reference is made to the adhesive arrangement, in the case of an adhesive arrangement having a single adhesive element this means the individual adhesive element and, in the case of an adhesive arrangement having a plurality of adhesive elements, it means all of the plurality of adhesive elements. If, for example, the adhesive arrangement is constituted by a single adhesive element, this single adhesive element can be brought into physical surface contact with the first side of the cover layer. If, on the other hand, the adhesive arrangement is constituted by a plurality of adhesive elements, all of the adhesive elements can be brought into physical surface contact with the first side of the cover layer. In particular, the plurality of adhesive elements are brought into physical contact with the first side at the same time. In the case of displaceable adhesive elements, however, the adhesive elements can also be brought successively into physical contact with the first side. The holding plane is the plane in which the individual adhesive element, or the plurality of adhesive elements, is/are arranged when the adhesive arrangement is brought into physical surface contact with the first side of the cover layer. Preferably, the individual adhesive element, or the plurality of adhesive elements, is/are flat.

Gripping adhesively means gripping by adhesive forces. Adhesive forces are molecular forces of attraction that act between mutually contacting surfaces. To enable the application of adhesive forces that are of sufficient magnitude to lift off the cover layer, according to the invention the at least one adhesive element is realized with an adhesive structure. In this respect, the adhesive element is to be distinguished, for example, from such adhesive elements that, for the purpose of gripping, have an unstructured layer of adhesive. Adhesive elements having an adhesive structure, as such, are generally known. In the case of adhesive elements having an adhesive structure, the adhesive forces are typically constituted, at least substantially, by Van der Waals forces. The at least one adhesive element according to the invention may have, for example, a microstructure and/or a mesostructure. Preferably, the at least one adhesive element is made of a polymer. For the purpose of gripping the cover layer, the adhesive arrangement, i.e. the individual adhesive element, or the plurality of adhesive elements, and the cover layer may be pressed together. This results in the said adhesive forces being realized between the adhesive arrangement and the cover layer, such that the cover layer is gripped adhesively. Once the cover layer has been gripped, the cover layer can be lifted off from the primary packaging elements, the cover layer being held by the adhesive forces.

The design of the gripping unit according to the invention overcomes the disadvantages mentioned above in connection with vacuum-based gripping units. The handling system according to the invention can be easily operated and cleaned, this resulting, in particular, from the design of the gripping unit. Preferably, the gripping unit is designed in such a way that it can be treated and/or autoclaved with conventional pharmaceutical cleaning agents and disinfectants.

According to the invention, the diameter of the smallest circle lying in the holding plane and surrounding the adhesive arrangement, i.e. the individual adhesive element or the plurality of adhesive elements, is at least 50 mm. Such a design, or dimensioning, of the adhesive arrangement ensures that the edges of a gripped cover layer hang down only slightly at most when being off, even when a flexible cover layer is used. Accordingly, the likelihood of particles getting onto the primary packaging elements or into the primary packaging elements when the cover layer is being lifted off is low. Preferably, the diameter of the smallest circle is at least 70 mm, particularly preferably at least 100 mm.

According to a preferred embodiment, it is provided that the at least one adhesive element comprises a multiplicity of elastically deformable adhesive projections. Preferably, a diameter of the adhesive projections is less than 1 mm. Such small-dimensioned adhesive projections, by deforming, can effectively compensate for unevenness of the surface to be contacted, providing an adhesive element that can realize high adhesive forces. Preferably, the diameter of the adhesive projections is less than 500 μm, particularly preferably less than 200 μm.

With regard to the shape of the adhesive projections, various designs are possible. Preferably, the adhesive projections are columnar. A columnar adhesive projection has an at least substantially constant, in particular circular, cross-section. Alternatively, the adhesive projections are preferably mushroom-shaped. In the case of a mushroom-shaped adhesive projection, the cross-sectional area of a contact portion of the adhesive projection used for contacting the cover layer is larger than the cross-sectional area of a support portion, of the same adhesive projection, that carries the contact portion.

According to a preferred embodiment, it is provided that the cover layer has a plurality of corners, and that the adhesive arrangement, i.e. the single adhesive element or the plurality of adhesive elements, can be brought into physical contact with the first side of the cover layer in such a way that the distance between the corners of the cover layer and the adhesive arrangement is less than 40 mm, preferably less than 30 mm. Such matching of the adhesive arrangement to the dimensions of the cover layer is particularly effective in preventing the edges of the cover layer from hanging down.

According to a preferred embodiment, it is provided that the adhesive arrangement, i.e. the single adhesive element or the plurality of adhesive elements, can be brought into physical contact with the first side of the cover layer in such a way that the distance between the edge centers of the edges of the cover layer and the adhesive arrangement is less than 40 mm, preferably less than 30 mm. Again, such adaptation of the adhesive arrangement to the dimensions of the cover layer is effective in preventing the edges of the cover layer from hanging down.

Preferably, the at least one adhesive element is realized as an adhesive film. An adhesive element realized as an adhesive film has the advantage that the dimensions of the adhesive element can be easily matched to a wanted dimension. For example, for this purpose the adhesive film is cut to the wanted dimensions. Preferably, the adhesive film is fastened to the gripping unit by means of an adhesive bond. If there are a plurality of adhesive elements, all adhesive elements are preferably realized as adhesive films.

According to a preferred embodiment, it is provided that the adhesive arrangement has an adhesive element that is X-shaped, C-shaped, U-shaped or in the shape of a ring, in particular in the shape of a circular ring or a rectangular ring. In the case of an adhesive element shaped in this way, a gripped cover layer can be detached from the gripping unit by simple design means, for example by means of at least one press-off punch or at least one stationary retainer. Preferably, the adhesive element is the only adhesive element of the adhesive arrangement. However, the adhesive arrangement may also have at least one further adhesive element.

Preferably, the adhesive arrangement comprises a plurality of adhesive elements. Increasing the number of adhesive elements is particularly effective in preventing the edges of the cover layer from hanging down. Preferably, the gripping unit comprises at least three adhesive elements, preferably at least four adhesive elements. Particularly preferably, there are four adhesive elements that are each arranged at a different corner of a notional parallelogram. Typically, the cover layer is rectangular in shape. A gripping unit having four adhesive elements, each arranged at a different corner of a notional parallelogram, then has the advantage that the adhesive elements can be arranged at a respectively different corner, or adjacent to a respectively different corner, of the cover layer, or at a respectively different edge center, or adjacent to a respectively different edge center, of the cover layer. Particularly preferably, the adhesive arrangement comprises at least four and at most ten adhesive elements.

According to a preferred embodiment, it is provided that the primary packaging elements comprise a first end that faces toward the cover layer, and that the plurality of adhesive elements can be brought into physical contact with the first side of the cover layer in such a way that each of the adhesive elements, in a direction of view perpendicular to the holding plane, is brought into at least partial congruence with respectively at least one first end of a primary packaging element arranged directly beneath the cover layer. If the above feature is realized, the portions of the cover layer contacted by the adhesive elements are each supported on respectively at least one of the first ends when the gripping unit is appropriately aligned and arranged relative to the transport container. In particular in the case of flexible cover layers, this can increase the pressing force with which the adhesive elements and the cover layer are pressed together. If, in the contacting of the cover layer, one or more of the adhesive elements were not brought into congruence with at least one of the first ends, the cover layer could bend in the region of the respective adhesive element, or elements, thereby making it more difficult to grip the cover layer in any case. The first ends of the primary packaging elements are constituted, for example, by bases of the primary packaging elements or by rims of openings of the primary packaging elements.

According to a preferred embodiment, it is provided that the gripping unit comprises a plurality of receiving structures, and that the adhesive elements are arranged on ends of the receiving structures. As a result of being arranged on the ends of the receiving structures, the adhesive elements can be spaced axially from a main structure of the gripping unit with respect to an axis that is perpendicular to the holding plane. The adhesive elements are then more easily accessible for contacting the cover layer. In particular, there is respectively only one adhesive element arranged on each end. However, a plurality of adhesive elements may also be arranged on the same end. Preferably, the receiving structures have a columnar shape or punch shape. Various cross-sections are possible for the columnar receiving structures. For example, the columnar receiving structures have a circular, rectangular or elliptical cross-section. If the receiving structures are punch-shaped, they have a widened end portion.

According to a preferred embodiment, it is provided that the receiving structures are each arranged on a different side arm of the gripping unit that extends parallel or at an angle to the holding plane. The side arms make it possible, advantageously, to realize a wanted distance between the receiving structures, or the adhesive elements arranged thereon.

According to a preferred embodiment, it is provided that in each case there is a different spring unit held, in particular held under preload, between the receiving structures and the gripping unit, a restoring force being applied to each of the receiving structures by the spring units, and the receiving structures being displaceable, against the respective restoring force, in a first direction that is perpendicular to the holding plane. Such a design of the gripping unit makes it possible to limit the pressing force, in dependence on the design of the spring units, when the adhesive arrangement and the cover layer are being pressed together and, as a result, to avoid over-pressing of the adhesive elements. Over-pressing describes the effect whereby the adhesive elements and the cover layer are pressed together with such a high pressing force that the adhesive projections of the adhesive elements buckle. The free ends of the adhesive projections are then aligned at an angle to the cover layer, such that, at most, only reduced adhesive forces can be applied. This effect that occurs with over-pressing is also known as “Euler buckling”.

According to a preferred embodiment, it is provided that the receiving structures are each held so as to be displaceable in a different recess of the gripping unit, that the gripping unit comprises an actuator means having at least one actuator, and that the actuator means is designed to displace the receiving structures in the first direction, for the purpose of detaching a gripped cover layer, to such an extent that the adhesive elements are arranged in the recesses. Displacement of the adhesive elements into the recesses allows a gripped cover layer to be detached safely. In particular, upon the adhesive elements being displaced into the recesses, the cover layer is held back by a bottom surface of the gripping unit from which the recesses extend.

According to a preferred embodiment, it is provided that a respectively different actuator is assigned to each receiving structure for the purpose of displacing the receiving structure. This allows a gripped cover layer to be detached from the gripping unit in a particularly controlled manner. For example, the adhesive elements are displaced into the recesses in succession or in pairs.

Preferably, the handling system comprises a handling means, in particular a four-axis robot, six-axis robot or handling means having two movable axes, designed to move the gripping unit toward the cover layer and to press the adhesive arrangement against the first side of the cover layer. Preferably, the gripping unit is detachably connected to the handling means. However, the gripping unit may also be an integral constituent part of the handling means. The handling system may also comprise a handling means, in particular a four-axis robot, six-axis robot or handling means having two movable axes, designed to move the transport container with the cover layer toward the adhesive arrangement and to press the first side of the cover layer against the adhesive arrangement. Such a handling means may be provided as an alternative or in addition to the aforementioned handling means.

According to a preferred embodiment, it is provided that the gripping unit comprises at least one press-off punch, which can be pressed against the first side of the cover layer for the purpose of detaching a gripped cover layer. A gripped cover layer may also be safely detached by one or more press-off punches. If a plurality of press-off punches are provided, there is also the advantage that the detaching process can be controlled with particular precision. For example, for this purpose the press-off punches are pressed in succession against the first side of the cover layer. Preferably, the at least one press-off punch is displaceable along an axis that is perpendicular to the holding plane.

According to a preferred embodiment, it is provided that the gripping unit comprises at least two portions that are displaceable relative to each other and that each carry a different adhesive element or a different group of adhesive elements, an actuator being provided for displacing the portions relative to each other, and a gripped cover layer being detachable from the gripping unit by displacement of the portions relative to each other. Such a design of the gripping unit also allows a gripped cover layer to be detached safely. Preferably, the portions are displaceable relative to each other along an axis that is parallel to the holding plane. If the portions are moved toward each other along this axis, for example, the angle between the adhesive elements and the gripped portions of the cover layer is increased as the cover layer is bent. As a result, the cover layer detaches from the adhesive elements.

Preferably, the handling system comprises at least one stationary retainer, which is designed and arranged in such a way that it can be brought to bear against the first side of a gripped cover layer, the gripped cover layer being detachable from the gripping unit as a result of the gripping unit being moved in a direction away from the cover layer when the retainer is brought to bear against the first side. Such a retainer also allows a gripped cover layer to be safely detached from the gripping unit. Preferably, the retainer is designed and arranged in such a way that it can be brought to bear against the first side of the cover layer between two adhesive elements or between two legs of a single adhesive element. With the retainer in such bearing contact, the cover layer is detached particularly safely. Particularly preferably, the retainer is realized in the shape of a spatula. There may also be a plurality of retainers, differing from one another, for example in their dimensions.

According to a preferred embodiment, it is provided that arranged beneath the retainer there is a slide unit that has a slide surface, the slide surface, or a notional extension of the slide surface, extending in the sliding direction through a collecting opening of a collecting container for cover layers. Cover layers that are detached from the gripping unit by the retainer fall onto the slide surface and slide into the collecting container. Collection of the cover layers in the collecting container makes it easier to dispose of them.

Preferably, the handling system comprises at least one sensor unit that is designed to recognize a cover layer gripped by the gripping unit. This provides a means of monitoring the correct execution of a lifting process. Preferably, the sensor unit is realized as a radiation sensor, in particular a camera sensor or laser sensor. Alternatively, the sensor unit is preferably realized as a force sensor and integrated into the gripping unit in such a way that the weight of the gripped cover layer acts upon the force sensor. A sensor unit realized as a force sensor also has the advantage that the pressing force acting upon the adhesive arrangement during pressing together can be measured. Accordingly, such a force sensor makes it possible to control the pressing together in such a way that the adhesive element, or the adhesive elements, are not over-pressed.

The object to be achieved is also achieved by a cleanroom having the features of Claim 19. A handling system having the features described above is arranged in the cleanroom. Preferably, the handling system is part of a pharmaceutical production machine.

With regard to the advantages that can be achieved with the cleanroom, reference is made to the explanations relating to the handling system and/or the method. The features described in connection with the handling system and/or the method may be used with regard to the further design the cleanroom.

The object to be achieved is also achieved by a method for lifting off cover layers, the method comprising:

Providing a dish-shaped transport container, in particular a tub, with pharmaceutical primary packaging elements arranged therein, in particular receptacles or closure elements, the primary packaging elements being covered by a cover layer, in particular a cover film.

Providing a device that has a gripping unit comprising an adhesive arrangement that is constituted by at least one adhesive element, the adhesive element being realized with an adhesive structure for gripping the cover layer adhesively, and the diameter of the smallest circle that lies in a holding plane of the adhesive arrangement and surrounds the adhesive arrangement being at least 50 mm.

Pressing together the adhesive arrangement and the cover layer, the adhesive arrangement being brought into physical surface contact with a first side of the cover layer that faces away from the primary packaging elements, and the cover layer being gripped adhesively by the adhesive arrangement.

Lifting off the gripped cover layer from the primary packaging elements. Detaching the lifted-off cover layer from the gripping unit.

Advantages and possibilities for development of the handling system are to be understood as also being described in relation to the method and, conversely, advantages and possibilities for development of the method are to be understood as also being described in relation to the handling system.

With regard to the pressing together of the adhesive arrangement and the cover layer, various embodiments of the method are possible. In a preferred first embodiment, the transport container with the cover layer is pressed against the stationary gripping unit. In a preferred second embodiment, the gripping unit with the adhesive arrangement is pressed against the cover layer of the stationary transport container. In a third embodiment, the adhesive arrangement and the cover layer are moved toward each other, such that neither the gripping unit nor the transport container are stationary.

If a plurality of adhesive elements are provided, the adhesive elements each contact a different portion of the cover layer when they are pressed together. Preferably, the adhesive elements and the cover layer are pressed together in such a way that the portions of the cover layer contacted by the adhesive elements are each supported, at least in part, on at least one primary packaging element arranged directly beneath the cover layer. The supporting of the contacted portions has the advantage that a pressing force of a wanted magnitude can be achieved even with a flexible cover layer.

Preferably, the cover layer is detached from the gripping unit by a jerking movement of the gripping unit. The inertia and the air resistance of the cover layer are thus utilized for detaching. This procedure has the advantage that only minor design requirements apply to the gripping unit used. Alternatively, the cover layer is preferably detached from the gripping unit by a stationary retainer. In this case, the first side of the gripped cover layer is brought to bear against the retainer. By moving the gripping unit in a direction away from the cover layer, the cover layer is then detached by means of the retainer. Alternatively, the cover layer is preferably detached from the gripping unit by the displacing of adhesive elements relative to each other. The displacing of adhesive elements relative to each other causes the angle between the adhesive elements and the gripping portions of the cover layer to be increased. As a result, the cover layer detaches from the adhesive elements. Alternatively, the cover layer is preferably detached from the gripping unit by the displacing of adhesive elements into recesses in the gripping unit. If the adhesive elements are displaced into the recesses, the gripped cover layer is retained, for example, by a bottom surface of the gripping unit from which the recesses extend. Alternatively, the cover layer is preferably detached from the gripping unit by at least one press-off punch held displaceably on the gripping unit. The cover layer may also be safely detached from the gripping unit by one or more press-off punches.

BRIEF DESCRIPTION OF THE DRAWINGS

The invention is described in greater detail below with reference to the figures, with identical or functionally identical elements being denoted only once by reference designations where appropriate. The figures serve as examples and are not to be understood as being restrictive. In the figures

DETAILED DESCRIPTION

Figure 1:
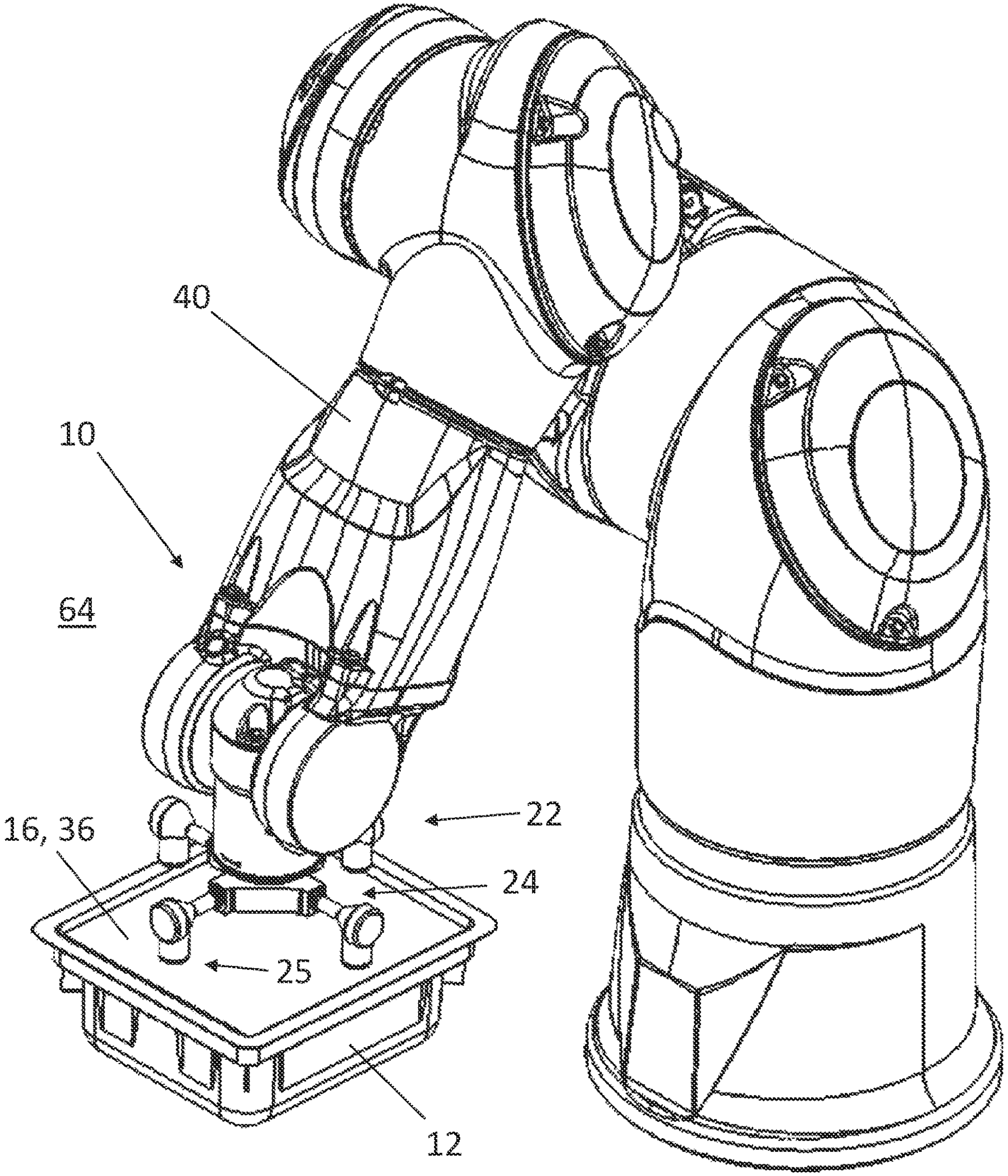
FIG. 1 shows a perspective representation of a handling system, which comprises a transport container with pharmaceutical primary packaging elements arranged therein, and a device having a gripping unit.
Figure 2:
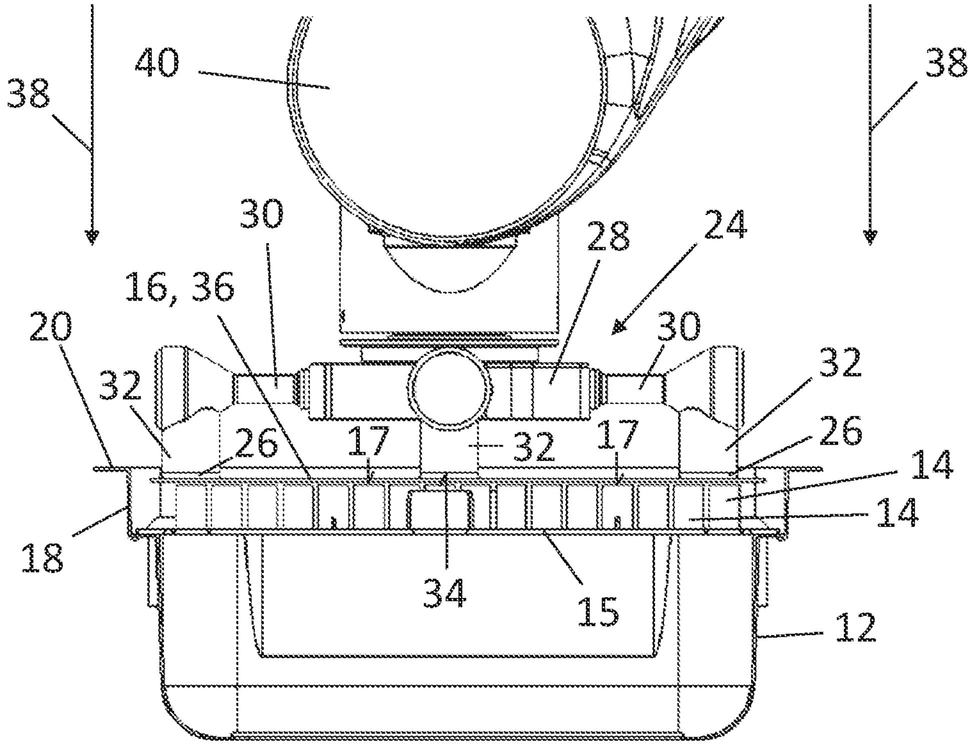
FIG. 2 shows a sectional representation of the transport container and of the gripping unit when a cover layer, arranged in the transport container, is being lifted off by the gripping unit.
Figure 3:
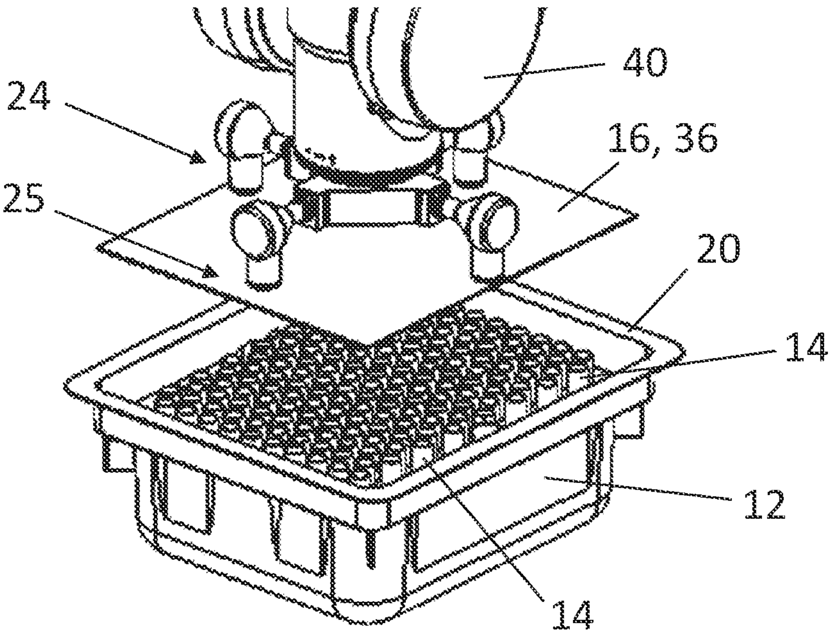
FIG. 3 shows a perspective representation of the handling system following the lifting-off of the cover layer.

FIGS. 1 to 3 show a handling system 10 that is arranged, as part of a pharmaceutical production machine, in a cleanroom 64.

The system 10 comprises at least one dish-shaped transport container 12. In each of FIGS. 1 to 3, only a single dish-shaped transport container 12 is represented. Typically, however, there is a multiplicity of dish-shaped transport containers 12.

In the present case, the transport container 12 is realized as a tub 12. Pharmaceutical primary packaging elements 14 are arranged, or stored, in the transport container 12. In the case of the exemplary embodiment represented, the primary packaging elements 14 are receptacles 14 for syringes.

In the present case, the primary packaging elements 14 are arranged nested in the transport container 12. This means that the primary packaging elements 14 are accommodated in a nest 15. The nest 15 is arranged together with the primary packaging elements 14 in the transport container 12.

The primary packaging elements 14 are covered by a cover layer 16. In the present case, the cover layer 16 is placed directly onto the primary packaging elements 14. The primary packaging elements 14 each comprise an end 17 that faces toward the cover layer 16. In the present case, the ends 17 are constituted by opening edges of the primary packaging elements 14. The cover layer 16 is surrounded by a side wall 18 of the transport container 12 and is thus arranged in the transport container 12. In the case of the exemplary embodiment represented, the cover layer 16 is a flexible cover film 16.

In the present case, the cover layer 16, or cover film 16, is gas-permeable, and for this purpose comprises a polyethylene-woven fabric. The gas-permeable design of the cover layer 16 has the advantage that, during sterilization with a gaseous sterilizing agent such as, for example, ethylene oxide, the sterilizing agent can pass through the cover layer 16.

The transport container 12 comprises a lateral overhang 20. Typically, during the sterilization process the transport container 12 is closed by a closure layer stuck to the overhang 20. Preferably, the closure layer matches the cover layer 16 in respect of its design. In FIGS. 1 to 3, the said closure layer has already been removed from the transport container 12 and is therefore not visible.

The handling system 10 also comprises a device 22 for lifting off the cover layer 16. The device 22 comprises a gripping unit 24 having an adhesive arrangement 25.

In the case of the exemplary embodiment represented in FIGS. 1 to 3, the adhesive arrangement 25 is constituted by a plurality of adhesive elements 26 that are spaced apart from one another. However, the adhesive arrangement 25 may also be constituted by a single adhesive element 26, as shown, for example, in FIG. 10. Irrespective of the number of adhesive elements 26, the adhesive arrangement 25 in all the exemplary embodiments represented in the figures is dimensioned in such a way that the smallest circle that lies in a holding plane of the adhesive arrangement 25 and surrounds the adhesive arrangement 25, i.e. the plurality of adhesive elements 26 or the single adhesive element 26, has a diameter of at least 50 mm. Preferably, the circle has a diameter of at least 70 mm, particularly preferably a diameter of at least 100 mm. In the exemplary embodiments represented, the adhesive elements 26 are realized as adhesive films 26.

The adhesive elements 26 are realized with an adhesive structure for gripping the cover layer 16 adhesively. The adhesive structure of the adhesive elements 26 is preferably constituted in each case by a multiplicity of elastically deformable adhesive projections. Preferably, a diameter of the adhesive projections is less than 1 mm. The adhesive structure is then accordingly realized as a microstructure. Due to their dimensions, the adhesive projections are not visible in the figures. For example, the adhesive projections are pin-shaped or mushroom-shaped.

In the case of the exemplary embodiment represented in FIGS. 1 to 3, there are four adhesive elements 26. The adhesive elements 26 are each arranged at a different corner of a notional parallelogram. In the present case, the parallelogram is a square.

The gripping unit 24 comprises a central main body 28. Arranged on the main body 28 in the present case are four side arms 30, which extend out from the main body 28, parallel to the holding plane. Arranged at the outer ends of the side arms 30 there is a respective receiving structure 32, which in the present case is columnar. The adhesive elements 26 are arranged on the ends 34 of the columnar receiving structures 32.

The adhesive elements 26 are arranged in such a way that they can be brought together into physical surface contact with a first side 36 of the cover layer 16 that faces away from the primary packaging elements 14. In the exemplary embodiment represented, the adhesive elements 26 are arranged in such a way that they can be brought into physical contact with the first side 36 of the cover layer 16, adjacently to a respective other edge of the cover layer 16. The distance between the centers of the edges and the nearest adhesive element 26 is less than 40 mm.

In the present case, the adhesive elements 26 are arranged so as to be complementary to the primary packaging elements 14. The adhesive elements 26 can therefore be brought into physical contact with the first side 36 of the cover layer 16 in such a way that each of the adhesive elements 26, in a direction of view 38 perpendicular to the holding plane, is brought into at least partial congruence with respectively at least one first end 17 of a primary packaging element 14 arranged directly beneath the cover layer 16. This is shown clearly in FIG. 2. The advantage of such a complementary arrangement of the adhesive elements 26 and the primary packaging elements 14 will be explained in greater detail below.

The device 22 also comprises a handling means 40. The handling means 40 is realized, by way of example, as a six-axis robot 40. In the case of the exemplary embodiment represented, the handling means 40 is designed to move the gripping unit 24 toward the cover layer 16 and to press the adhesive elements 26 against the cover layer 16. Alternatively, the handling means 40 may also be designed to move the transport container 12, with the cover layer 16 located therein, toward the adhesive elements 26 and to press the cover layer 16 against the adhesive elements 26 by moving the transport container 12. In such an embodiment, the gripping unit 24 is preferably arranged in a stationary manner.

In the following, a method for lifting off the cover layer 16 from the primary packaging elements 14 is explained in greater detail. The gripping unit 24 is moved toward the cover layer 16 by the handling means 40, and the adhesive arrangement 25 is pressed against the first side 36 of the cover layer 16. The pressing of the adhesive arrangement 25 against the cover layer 16 causes the cover layer 16 to be gripped adhesively by the adhesive arrangement 25, i.e. the plurality of adhesive elements 26.

Upon being pressed together, the gripping unit 24 and the transport container 12 are preferably aligned relative to each other in such a way that each of the adhesive elements 26, in the direction of view 38, is brought into at least partial congruence with respectively at least one first end 17 of a primary packaging element 14 arranged directly beneath the cover layer 16. As a result, the portions of the cover layer 16 contacted by the adhesive elements 26 are supported by the primary packaging elements 14 arranged directly underneath. In particular, in the case of a flexible cover layer 16, a non-complementary arrangement of the adhesive elements 26 and the primary packaging elements 14 could result in bending of the cover layer 16 when the cover layer 16 is contacted. This would at least make it more difficult to grip the cover layer 16 adhesively.

The adhesive arrangement 25 is preferably pressed against the cover layer 16 with a predefined pressing force. The pressing force is preferably selected such that over-pressing of the adhesive elements 26 is avoided.

After being gripped, the cover layer 16 is lifted off from the primary packaging elements 14 by the handling means 40. Due to the dimensions of the adhesive arrangement 25, described above, the edges and the borders of the cover layer 16 hang down only slightly at most when it is lifted off. Accordingly, the likelihood of particles from the cover layer 16 getting onto or into the primary packaging elements 14 when it is being lifted off is in any case extremely low.

After being lifted off, the cover layer 16 is detached from the gripping unit 24, such that the gripping unit 24 can be used for a subsequent lifting-off process on another transport container 12. With regard to detaching the cover layer 16, various advantageous procedures are possible, these being explained in greater detail below with reference to the handling system 10, or gripping units 24, represented in FIGS. 4 to 10.

Figure 4:
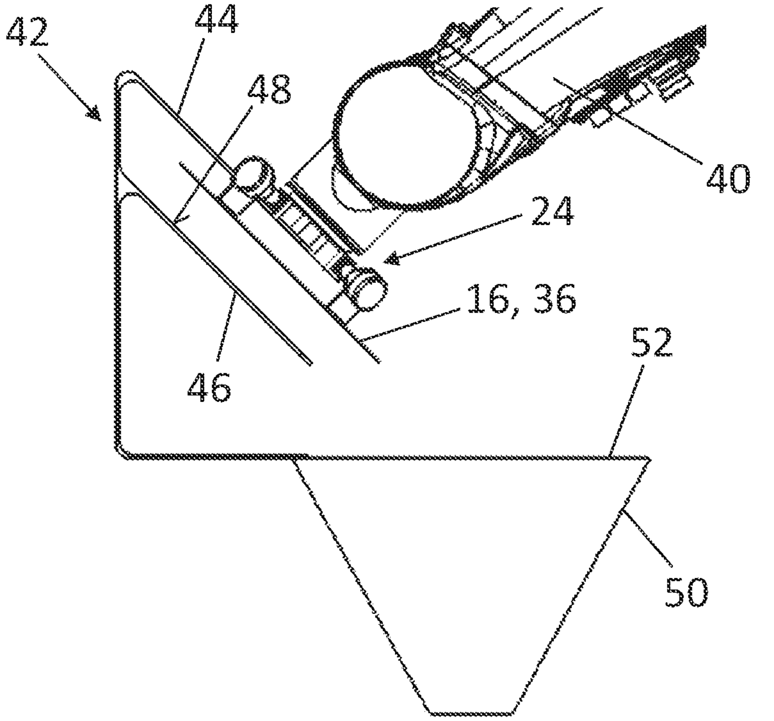
FIG. 4 shows a side view of a detaching unit for detaching a gripped cover layer from the gripping unit.
Figure 5:
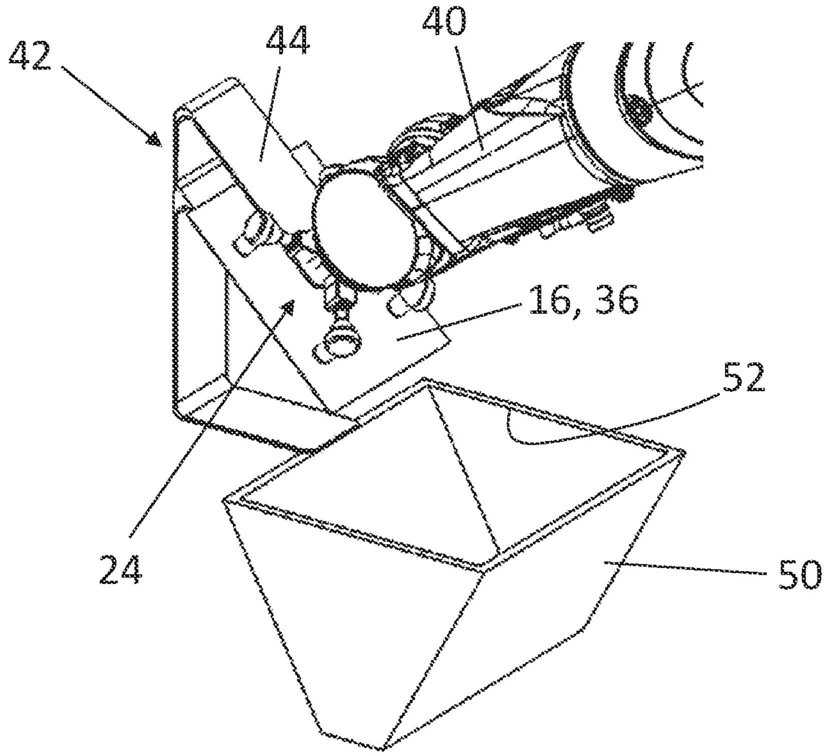
FIG. 5 shows a perspective representation of the detaching unit shown in FIG. 4.

In the case of the exemplary embodiment represented in FIGS. 4 and 5, the handling system 10 comprises a detaching unit 42 having a stationary retainer 44, which in the present case has the shape of a spatula. The retainer 44 is brought to bear against the first side 36 of a gripped cover layer 16. Once the retainer 44 has been brought to bear against the first side 36, the cover layer 16 is detached from the gripping unit 24 as a result of the gripping unit 24 moving in a direction away from the cover layer 16. Due to the spatula-shaped design of the retainer 44, the narrow retainer 44 can be brought between two adhesive elements 26 to bear against the first side 36 of the cover layer 16. Such bearing of the retainer 44 against the first side 36 of the cover layer 16 allows the cover layer to be detached from the gripping unit 24 in a particularly safe manner.

In the case of the exemplary embodiment represented, the detaching unit 42 also comprises a slide unit 46 that has a slide surface 48. The slide unit 46 is arranged beneath the retaining means 44, such that detached cover layers 16 fall onto the slide surface 48 of the slide unit 46.

The handling system 10 also comprises a collecting container 50 for cover layers 16. The collecting container 50 is arranged in such a way that a notional extension of the slide surface 48 extends in the sliding direction through a collecting opening 52 of the collecting container 50. Cover layers 16 falling onto the slide surface 48 are accordingly delivered to the collecting container 50.

Figure 6:
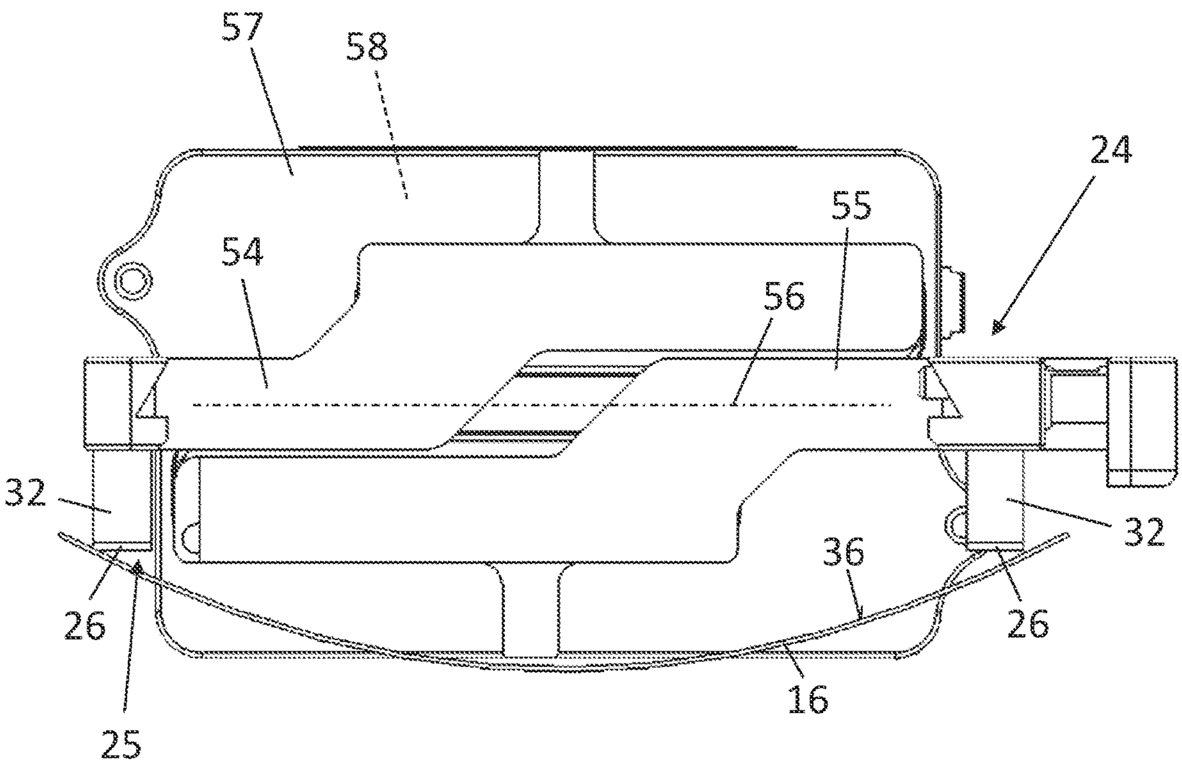
FIG. 6 shows a representation of a further exemplary embodiment of the gripping unit.

FIG. 6 shows a representation of a further exemplary embodiment of the gripping unit 24, with only two of the adhesive elements 26 being visible. The gripping unit 24 comprises a first portion 54 and a second portion 55, each of the portions 54 and 55 carrying a different one of the represented adhesive elements 26. In particular, the adhesive arrangement 25 comprises four adhesive elements 26, each of the portions 54 and 55 carrying two of the adhesive elements 26. However, one of the portions 54 and 55 may also carry three adhesive elements 26 and the other of the portions 54 and 55 only one adhesive element 26. The portions 54 and 55 are displaceable relative to each other. In the present case, the portions 54 and 55 are displaceable relative to each other along an axis 56 that is parallel to the holding plane. An actuator 58 is provided for displacing the portions 54 and 55 relative to each other. The actuator 58 is arranged in a housing 57 of the gripping unit 24 and is therefore not visible.

In order to detach the cover layer 16 in the case of the gripping unit 24 represented in FIG. 6, the portions 54 and

55 are preferably displaced by the actuator 58 in such a way that the distance between the adhesive elements 26 represented is reduced. This causes the angle between the adhesive elements 26 and the gripped cover layer 16 to increase. As a result, the cover layer 16 is detached from the gripping unit 24, as shown in FIG. 6.

Figure 7:
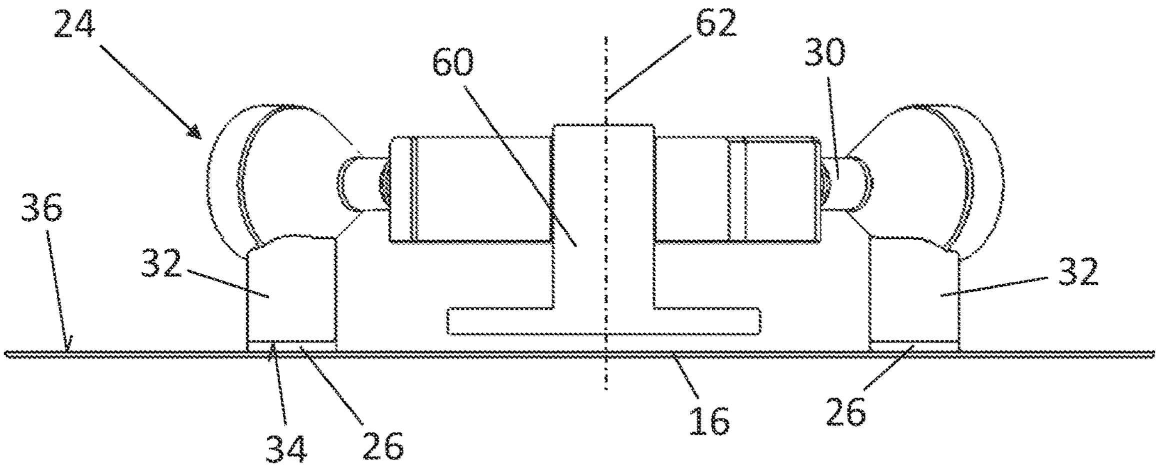
FIG. 7 shows a sectional representation of a further exemplary embodiment of the gripping unit.

FIG. 7 shows a sectional representation of a further exemplary embodiment of the gripping unit 24. In the case of the gripping unit 24 shown in FIG. 7, also, only two of the adhesive elements 26 are visible. The gripping unit 24 comprises a press-off punch 60, which is held displaceably on the gripping unit 24. In the present case, the press-off punch 60 is displaceable along an axis 62 that is perpendicular to the holding plane. In departure from the example shown in FIG. 7, there may also be a plurality of press-off punches 60.

In order to detach a gripped cover layer 16 in the case of the gripping unit 24 represented in FIG. 7, the press-off punch 60 is displaced along the axis 62 and pressed against the first side 36 of the cover layer 16.

Figure 8:
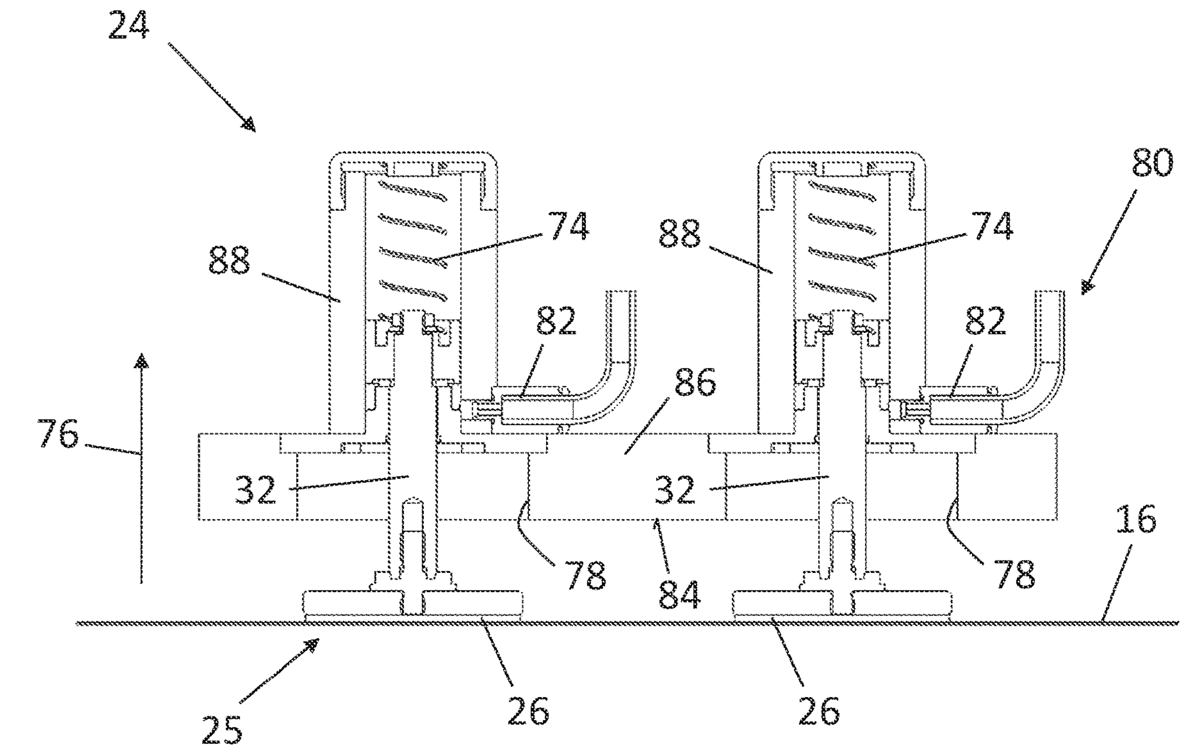
FIG. 8 shows a sectional representation of a further exemplary embodiment of the gripping unit.
Figure 9:
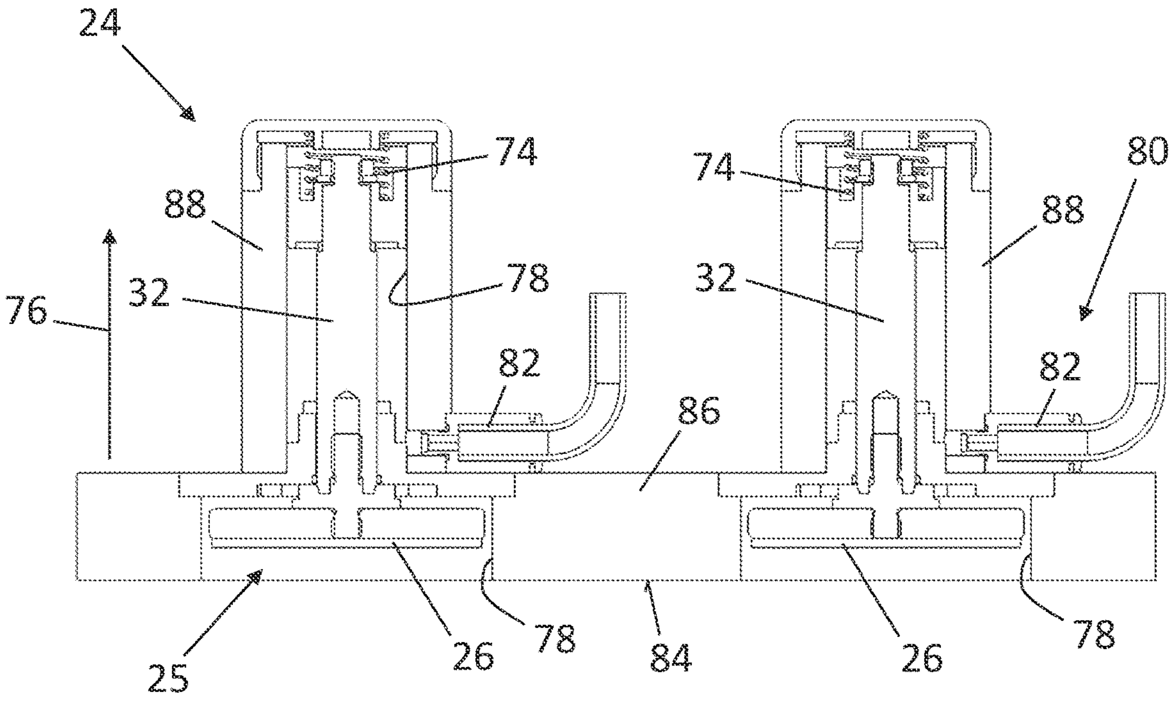
FIG. 9 shows a further sectional representation of the gripping unit shown in FIG. 8.

FIGS. 8 and 9 show sectional representations of a further exemplary embodiment of the gripping unit 24. In this case, only a detail of the gripping unit 24 is represented in each case. In this exemplary embodiment, the receiving structures 32, which in this case have the shape of a punch, are each held displaceably in a different recess 78 of the gripping unit 24. In the present case, the gripping unit 24 comprises a main body 86 with cavities realized therein. A plurality of pneumatic cylinders 88 are fastened to the main body 86. The cavities and the pneumatic cylinders 88 together form the recesses 78.

In each case, there is a different spring unit 74 held under preload between the receiving structures 32 and the gripping unit 24. In the present case, the spring units 74 are realized as coil springs 74. The receiving structures 32 is displaceable, against the restoring forces provided by the spring units 74, in a first direction 76 that is perpendicular to the holding plane.

When the adhesive arrangement 25 and the cover layer 16 are pressed together, the pressing force is limited by the spring units 74. As a result, over-pressing of the adhesive elements 26 is avoided.

In the present case, the gripping unit 24 comprises an actuator means 80 having a plurality of actuators 82 that, in the case of exemplary embodiment represented, are realized as pneumatic actuators 82. The actuators 82 are designed to displace the receiving structures 32 in the first direction 76 to such an extent that the adhesive elements 26 are arranged in the recesses 78. Such an arrangement of the adhesive elements 26 is shown in FIG. 9. When the adhesive elements 26 are displaced into the recesses 78, the cover layer 16 is retained by a bottom surface 84 of the gripping unit 24, or of the main body 86, from which the recesses 78 extend. Preferably, the adhesive elements 26 are displaced into the recesses 78 in succession or in pairs by the actuators 82.

Figure 10:
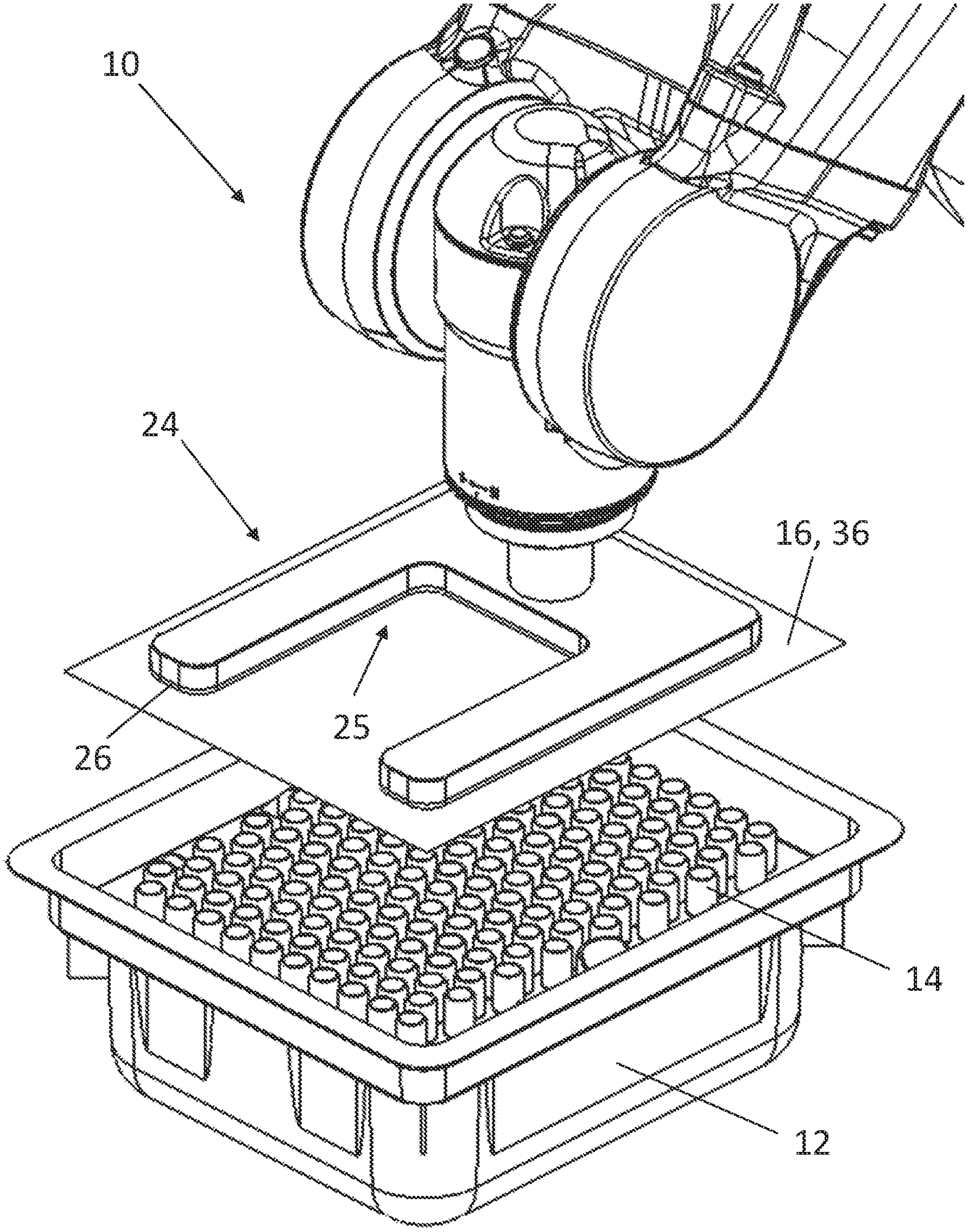
FIG. 10 shows a perspective representation of the handling system having a further gripping unit.

In the case of the exemplary embodiment of the gripping unit 24 represented in FIG. 10, the adhesive arrangement 25 is constituted by a single adhesive element 26. In the case of the exemplary embodiment represented, the adhesive element 26 is U-shaped.

The adhesive arrangement 25 is brought into physical contact with the cover layer 16 in such a way that the distance between the corners of the cover layer 16 and the adhesive arrangement 25 is less than 40 mm. Such an arrangement of the adhesive arrangement 25 on the cover layer 16 can also reliably prevent the edges of the cover layer 16 from hanging down when it is being lifted off.

In the case of the exemplary embodiment of the gripping unit 24 represented in FIG. 10, a gripped cover layer is detached, for example, by the retainer 44 shown in FIGS. 4 and 5. In addition, one or more displaceable press-off punches 60 may also be provided as part of the gripping unit 24.

In the case of a further exemplary embodiment of the method, the gripped cover layer 16 is detached from the gripping unit 24 by a jerking movement of the gripping unit 24. The inertia and the air resistance of the cover layer 16 are thus utilized for detaching. This has the advantage that neither a stationary retainer nor a special design of the gripping unit is required for detaching.

What is claimed is:

1. A handling system (10) for a cleanroom (64), comprising:

at least one dish-shaped transport container (12) with pharmaceutical primary packaging elements (14) arranged therein, the primary packaging elements (14) being covered by a cover layer (16), and a device (22) for lifting off the cover layer (16) from the primary packaging elements (14), the device (22) comprising a gripping unit (24) for gripping the cover layer (16), wherein the gripping unit (24) comprises an adhesive arrangement (25) that includes at least one adhesive element (26), the adhesive element (26) including an adhesive structure for gripping the cover layer (16) adhesively, the adhesive arrangement (25) can be brought into physical surface contact with a first side (36) of the cover layer (16) that faces away from the primary packaging elements (14), and a diameter of a smallest circle that lies in a holding plane of the adhesive arrangement (25) and surrounds the adhesive arrangement (25) is at least 50 mm.

2. The handling system (10) according to claim 1, wherein the cover layer (16) has a plurality of corners, and the adhesive arrangement (25) can be brought into physical contact with the first side (36) of the cover layer (16) in such a way that a distance between the corners of the cover layer (16) and the adhesive arrangement (25) is less than 40 mm.

3. The handling system (10) according to claim 1, wherein the cover layer (16) has a plurality of edges, and the adhesive arrangement (25) can be brought into physical contact with the first side (36) of the cover layer (16) in such a way that a distance between edge centers of the edges and the adhesive arrangement (25) is less than 40 mm.

4. The handling system (10) according to claim 1, wherein the adhesive element (26) includes an adhesive film (26).

5. The handling system (10) according to claim 1, wherein the adhesive arrangement (25) has an adhesive element (26) that is X-shaped, C-shaped, U-shaped or in the shape of a ring.

6. The handling system (10) according to claim 1, wherein the adhesive arrangement (25) comprises a plurality of adhesive elements (26) that are each arranged at a different corner of a notional parallelogram.

7. The handling system (10) according to claim 6, wherein the primary packaging elements (14) comprise a first end (17) that faces toward the cover layer (16), and the plurality of adhesive elements (26) can be brought into physical contact with the first side (36) of the cover layer (16) in such a way that each of the adhesive elements (26), in a direction of view (38) perpendicular to the holding plane, is brought into at least partial congruence with respectively at least one first end (17) of a primary packaging element (14) arranged directly beneath the cover layer (16).

8. The handling system (10) according to claim 6, wherein the gripping unit (24) comprises a plurality of receiving structures (32), and the adhesive elements (26) are arranged on ends (34) of the receiving structures (32).

9. The handling system (10) according to claim 8, wherein the receiving structures (32) are each arranged on a different side arm (30) of the gripping unit (24) that extends parallel or at an angle to the holding plane.

10. The handling system (10) according to claim 8, wherein there is a different spring unit (74) held between the receiving structures (32) and the gripping unit (24), a restoring force being applied to each of the receiving structures (32) by the spring units (74), and the receiving structures (32) being displaceable, against the respective restoring force, in a first direction (76) that is perpendicular to the holding plane.

11. The handling system (10) according to claim 10, wherein the receiving structures (32) are each held so as to be displaceable in a different recess (78) of the gripping unit (24), the gripping unit (24) comprises an actuator means (80) having at least one actuator (82), and that the actuator means (80) is designed to displace the receiving structures (32) in the first direction (76), for the purpose of detaching a gripped cover layer (16), so that the adhesive elements (26) are arranged in the recesses (78).

12. A handling system (10) according to claim 11, wherein a respectively different actuator (82) is assigned to each receiving structure (32).

13. The handling system (10) according to claim 1, further comprising a handling means (40) configured to move the gripping unit (24) toward the cover layer (16) and to press the adhesive arrangement (25) against the first side (36) of the cover layer (16), or a handling means configured to move the transport container (12) with the cover layer (16) toward the adhesive arrangement (25) and to press the first side (36) of the cover layer (16) against the adhesive arrangement (15).

14. The handling system (10) according to claim 1, wherein the gripping unit (24) comprises at least one press-off punch (60), which can be pressed against the first side (36) of the cover layer (16) for the purpose of detaching a gripped cover layer (16).

15. The handling system (10) according to claim 1, wherein the gripping unit (24) comprises at least two portions (54, 55) that are displaceable relative to each other, the portions (54, 55) each carrying a different adhesive element (26) or a different group of adhesive elements (26), an actuator (58) being provided for displacing the portions (54, 55) relative to each other, and a gripped cover layer (16) being detachable from the gripping unit (24) by displacement of the portions (54, 55) relative to each other.

16. The handling system (10) according to claim 1, further comprising at least one stationary retainer (44) configured and arranged to be brought to bear against the first side (36) of a gripped cover layer (16), and the gripped cover layer (16) being detachable from the gripping unit (24) as a result of the gripping unit (24) being moved in a direction away from the cover layer (16) when the at least one stationary retainer (44) is brought to bear against the first side (36).

17. The handling system (10) according to claim 16, wherein arranged beneath the at least one stationary retainer (44) there is a slide unit (46) that has a slide surface (48), the slide surface (48), or a notional extension of the slide surface (48), extending in a sliding direction through a collecting opening (52) of a collecting container (50) for cover layers (16).

18. The handling system (10) according to claim 1, further comprising at least one sensor unit configured to recognize a cover layer (16) gripped by the gripping unit (24).

19. A cleanroom (64), in which a handling system (10) according to claim 1 is arranged.

20. A method for lifting off cover layers (16), comprising:

a. providing a dish-shaped transport container (12) with pharmaceutical primary packaging elements (14) arranged therein, the primary packaging elements (14) being covered by a cover layer (16), b. providing a device (22) that has a gripping unit (24) comprising an adhesive arrangement (25) that includes at least one adhesive element (26), the adhesive element (26) including an adhesive structure for gripping the cover layer (16) adhesively, and a diameter of a smallest circle that lies in a holding plane of the adhesive arrangement (25) and surrounds the adhesive arrangement (25) being at least 50 mm, c. pressing together the adhesive arrangement (25) and the cover layer (16), the adhesive arrangement (25) being brought into physical surface contact with a first side (36) of the cover layer (16) that faces away from the primary packaging elements (14), and the cover layer (16) being gripped adhesively by the adhesive arrangement (25), d. lifting off the gripped cover layer (16) from the primary packaging elements (14), and e. detaching the lifted-off cover layer (16) from the gripping unit (24).

21. The method according to claim 20, wherein the cover layer (16) is detached from the gripping unit (24) by a jerking movement of the gripping unit (24), by a stationary retainer (44), by a displacing of adhesive elements (26) relative to each other, by a displacing of adhesive elements (26) into recesses (78) in the gripping unit (24), or by at least one press-off punch (60) held displaceably on the gripping unit (24).

* * * * *